United States Patent Office 3,650,955
Patented Mar. 21, 1972

3,650,955
GASEOUS MIXTURE FOR USE IN ELECTRICAL APPARATUS
Jean P. Manion, Milwaukee, John A. Philosophos, Brookfield, and Marquis B. Robinson, Milwaukee, Wis., assignors to Allis-Chalmers Manufacturing Company, Milwaukee, Wis.
Continuation of application Ser. No. 600,564, Dec. 9, 1966. This application May 27, 1970, Ser. No. 41,705
Int. Cl. H01b 3/24
U.S. Cl. 252—66
1 Claim

ABSTRACT OF THE DISCLOSURE

A gaseous mixture for arc extinguishing and insulating in circuit breakers comprising a first gas such as perfluorocyclobutane ($cC_4F_8$) having high dielectric strength but a relatively slow dielectric recovery rate and a second gas such as dichlorodifluoromethane ($CCl_2F_2$) which has a rapid initial dielectric recovery and only a moderately high ultimate dielectric strength in comparison to the first gas.

BACKGROUND OF THE INVENTION

This is a continuation of application Ser. No. 600,564 filed by Jean P. Manion, John A. Philosophos and Marquis B. Robinson on Dec. 9, 1966 for "Gaseous Mixture for Use in Electrical Apparatus" and now abandoned.

This invention relates to mixtures of gases for use in electrical apparatus, including EHV circuit breakers, to effect arc extinction and to insulate against electrical discharges.

In a gas type alternating current circuit interrupter the gaseous medium must possess two important properties. First, the medium must have a fast dielectric recovery so that during the process of interrupting an arc it will recover to a dielectric breakdown value high enough to withstand the recovery system voltage imposed as the current passes through zero and thus prevent the arc from restriking. Second, the medium must have a high ultimate dielectric strength so as to be able to prevent any corona discharges or arcing from occurring when the interrupting device is not being used but is connected in the high voltage circuit.

It is difficult to find a single gas which possesses the two above described properties to a sufficient degree to meet the requirements especially in extra high voltage applications without resorting to high gas pressures which in turn imposes limitations on the upper limit of acceptable condensation temperature of the gas to be used. Therefore, in accord with the present invention two or more gases are used in a mixture where each gas has only one or the other of the two properties optimized.

This invention distinguishes from previously reported gas mixtures in which an expensive gas possessing desirable electrical properties is mixed with a relatively cheap inert gas such as air or nitrogen so as to decrease the amount of the more expensive gas required and still maintain most of the latter's desirable electrical properties.

DESCRIPTION OF THE PREFERRED EMBODIMENT

Figure 1:
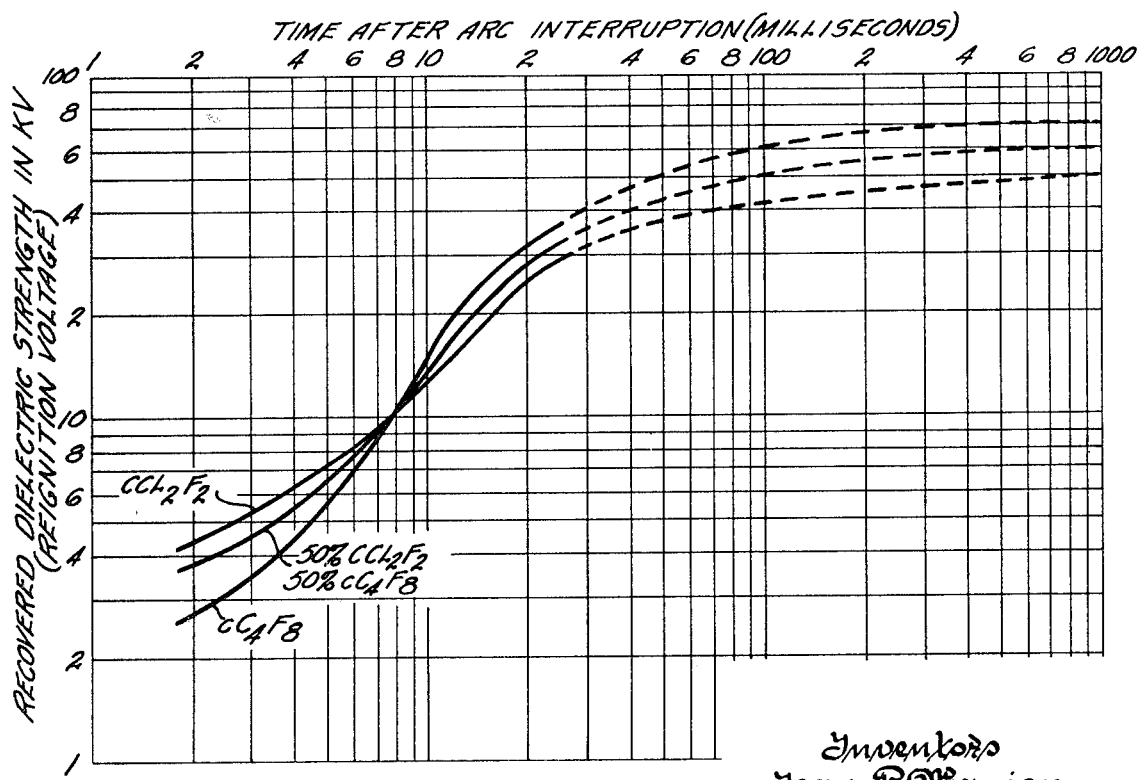
FIG. 1 is a graph illustrating the dielectric strength of a mixture of the gases $cC_4F_8$ and $CCl_2Fe_2$ in accordance with the present invention.

Specifically, this invention deals with a gaseous mixture comprising perfluorocyclobutane ($cC_4F_8$) which has a high dielectric strength but a relatively slow recovery rate and dichlorodifluoromethane ($CCl_2F_2$) which has a rapid initial dielectric recovery and only a moderately high ultimate dielectric strength. These properties of the individual component gases are illustrated in FIG. 1, wherein recovered dielectric strength in KV is plotted against time after arc interruption. FIG. 1 shows that the ultimate dielectric strength of the mixture is 10 kilovolts greater than that of $CCl_2F_2$ and that the mixture at the time of 2 milliseconds after arc cessation has recovered to a spark reignition value of 3800 volts which is 1100 volts above that of $cC_4F_8$ and only 600 volts below that of $CCl_2F_2$. By mixing these individual gases in the ratio of 1:1 in FIG. 1, but in no way limited to this ratio, a dielectric recovery characteristic is observed for the combination which incorporates the desirable properties of each individual gas into the resulting mixture.

Further, in addition to obtaining a mixture with the properties of the individual components an additional advantage is obtained for this gaseous mixture. It has been found as already noted that the dielectric recovery of the mixture during the early periods of recovery is greater than would normally be expected from a 50 percent mixture of the individual components. For example, as FIG. 1 shows, at two milliseconds after arc extinction the mixture has recovered 65 percent of the initial dielectric strength of the faster recovering gas $CCl_2F_2$. This represents 15 percent more than would be expected if a linear relationship based on mixture composition were to apply. This increased improvement in the recovery of dielectric strength during the few milliseconds after arc extinction is particularly advantageous since it is at these early time periods that the interrupting medium must attain a high dielectric breakdown value to withstand the rapidly increasing recovery system voltage.

There is more latitude in selecting individual gases for the ultimate mixture since each gas need only possess one of the properties stated above. One can thus more selectively choose gases with secondary important properties such as cost, boiling and freezing points.

Figure 2:
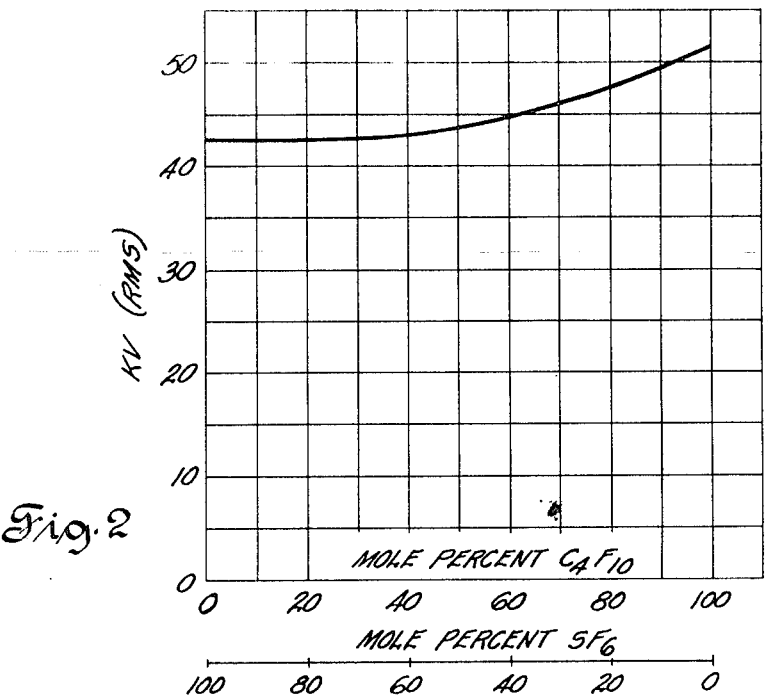
FIG. 2 is a graph illustrating the dielectric strength of a mixture of the gases $C_4F_{10}$ and $SF_6$ in accordance with prior art teachings.

In the process of selecting the component gases that are to go into the mixture, it has been found extremely useful to select one gas which has a high ultimate dielectric strength and a second gas which is known to possess a rapid rate of dielectric recovery in the early stages after arcing. It has been found that not all gases with these properties yield a mixture with a significantly improved ultimate dielectric strength. For example, the addition of $C_4F_{10}$ (with an ultimate dielectric strength of 51.5 kv.) to $SF_6$ (with an ultimate dielectric strength of 42.2 kv.) at molar concentrations which permit an improvement in the initial recovery charateristics of the mixture results in mixtures, such as illustrated in FIG. 2, which have ultimate dielectric strengths not significantly different from that of the low dielectric gas. However, it has been found that by a judicious selection of gas mixtures, significant increases in ultimate dielectric strength can be observed at a concentration at which little loss occurs in the initial recovery characteristics of the faster, low ultimate dielectric strength gas. More specifically, there should be selected a first gas ($cC_4F_8$) having a first ionization potential greater than that of a second gas so that when exposed to an electric arc a charge transfer occurs rapidly and efficiently from the first gas to the second gas effectively upon every collision between molecules of the second gas and ions of the first gas, and wherein deionization of the gas mixture then proceeds at the deionization rate of the second gas. In general, it has been found that a mixture thus selected the dielectric strength is linearly related to the mole percent of the two gases present while the initial recovery level of the mixture is close to that of the fast recovering gas.

The principle of operation of the gas mixture disclosed herein is believed to be as follows. According to the mechanism believed to be operative, behavior illustrated in FIG. 1 can be obtained if the fast gas (such as $CCl_2F_2$) has an ionization potential and excited states equal to or slightly less than that of the slow gas (such as $cC_4F_8$). An additional requirement is that the charge transfer shown in Formula 1 below be fast compared to the charge neutralization reaction shown in Formula 2 below. In the following example formulae B is considered to be the fast gas and A the slow gas with charge transfer occurring rapidly and probably upon every collision between a B molecule and an A ion. It will be understood that the charge transfer being discussed can occur whenever there are ions of the higher ionization potential species present and in a state of collision with the molecules of the lower ionization potential species. More specifically, the efficacious effect achieved is believed to occur in the minute interval of time just before, during and after current zero. Deionization of the gas mixture then proceeds via reaction in Formula 2 at a rate characteristic of B.

(1) $\qquad A^+ + B = A + B^+$ (2) $\qquad B^+ + e^- = B$

The example illustrating recovery rates for two typical gases is given in the accompanying FIG. 1 of the drawing. It is seen that the gas $CCl_2F_2$ which has recovered rapidly has a low ultimate dielectric strength while the gas $cC_4F_8$ which is lower in the initial phases of recovery possesses significantly greater ultimate voltage standoff ability. The problem for the gas $cC_4F_8$ when used as an interrupting medium is whether the rate of circuit voltage recovery is slow enough to permit the gas to attain its inherent dielectric strength. Gas $CCl_2F_2$ on the other hand has a rapid initial recovery, but low ultimate strength and could be reignited by a high voltage circuit before the electrodes had fully parted. If the recovery characteristics of a gaseous mixture are found to be governed by the charge transfer mechanism described above, a considerable increase in interruption ability is obtained for the optimized concentration of a mixture of gases such as A and B described above. It is known that the first ionization potential of $cC_4F_8$ is approximately 12.8 electron volts and that the first ionization potential of $CCl_2F_2$ is 11.7 electron volts. Thus, one of the criteria that the fast gas have a lower first ionization potential is satisfied. (See: F. W. Blodgett, Trans. AIEE v. 78, nt. 1, March 1959, pp. 63–6; Fahlenwerte and Funktionen (book) Landolt-Bornstein, Springer-Verlog, Berlin, Germany, pp. 359–68; G. Camilli, R. Plump, Trans. AIEE, v. 72, Pt. 1, 1953, pp. 93–102.)

The embodiments of the invention in which an exclusive property or privilege is claimed are defined as follows:

1. In combination,
    electrical apparatus having a chamber in which electric arcing periodically occurs and in which dielectric strength is maintained,
    and a gaseous medium in said chamber for arc extinguishing and electrical insulating purposes,
    said medium consisting of equal volumes of a first gas and a second gas,
    said first gas being perfluorocyclobutane ($cC_4F_8$) and said second gas being dichlorodifluoromethane ($CCl_2F_2$).

References Cited

UNITED STATES PATENTS 2,221,670   11/1970   Cooper   252—66 X
2,853,540   9/1958   Camilli et al.   252—66 X

OTHER REFERENCES

Chemical Abstracts, vol. 46, col. 849Sc.

JOHN D. WELSH, Primary Examiner

U.S. Cl. X.R.

200—148; 252—305, 372